(12) United States Patent
Gomyo (10) Patent No.: US 6,817,766 B2
(45) Date of Patent: Nov. 16, 2004

(54) DYNAMIC PRESSURE BEARING DEVICES AND METHOD FOR MANUFACTURING THE SAME

(75) Inventor: Masato Gomyo, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 82 days.

(21) Appl. No.: 10/304,458

(22) Filed: Nov. 25, 2002

(65) Prior Publication Data

US 2003/0108257 A1 Jun. 12, 2003

(30) Foreign Application Priority Data

Nov. 26, 2001 (JP) ........................................ 2001-359880

(51) Int. Cl.⁷ ........................... F16C 32/06; F16C 33/72
(52) U.S. Cl. ........................................ 384/100; 384/132
(58) Field of Search ................................ 384/100, 119, 384/121, 123, 124, 132; 360/99.08, 98.07, 99

(56) References Cited

U.S. PATENT DOCUMENTS 6,217,218 B1 * 4/2001 Inoue et al. ................. 384/119
6,456,458 B1 * 9/2002 Ichiyama .................. 360/99.08

* cited by examiner

Primary Examiner—Thomas R. Hannon
(74) Attorney, Agent, or Firm—Hogan & Hartson, LLP (57) ABSTRACT

A dynamic pressure bearing device including a dynamic pressure bearing member, a thrust dynamic pressure bearing member, and a fluid sealing section for preventing lubrication fluid in the thrust dynamic pressure bearing member from leaking outside, provided adjacent to an outer side section in a radial direction of the thrust dynamic pressure bearing member and defined by an outer circumference wall surface of the dynamic pressure bearing member. The outer circumference wall surface has an inclined outer surface having diameters that decrease in the axial direction, and a ridge section located removed in the axial direction from the fluid sealing section, wherein the outer circumference wall surface is receded in the radial direction along the ridge section than the inclined outer surface of the dynamic pressure bearing member.

20 Claims, 8 Drawing Sheets

DYNAMIC PRESSURE BEARING DEVICES AND METHOD FOR MANUFACTURING THE SAME

BACKGROUND OF THE INVENTION

1. Field of the Invention

The present invention relates to dynamic pressure bearing devices, each equipped with a dynamic pressure bearing member that supports a rotation shaft with dynamic pressure generated by lubricating fluid.

2. Related Background Art

Figure 13:
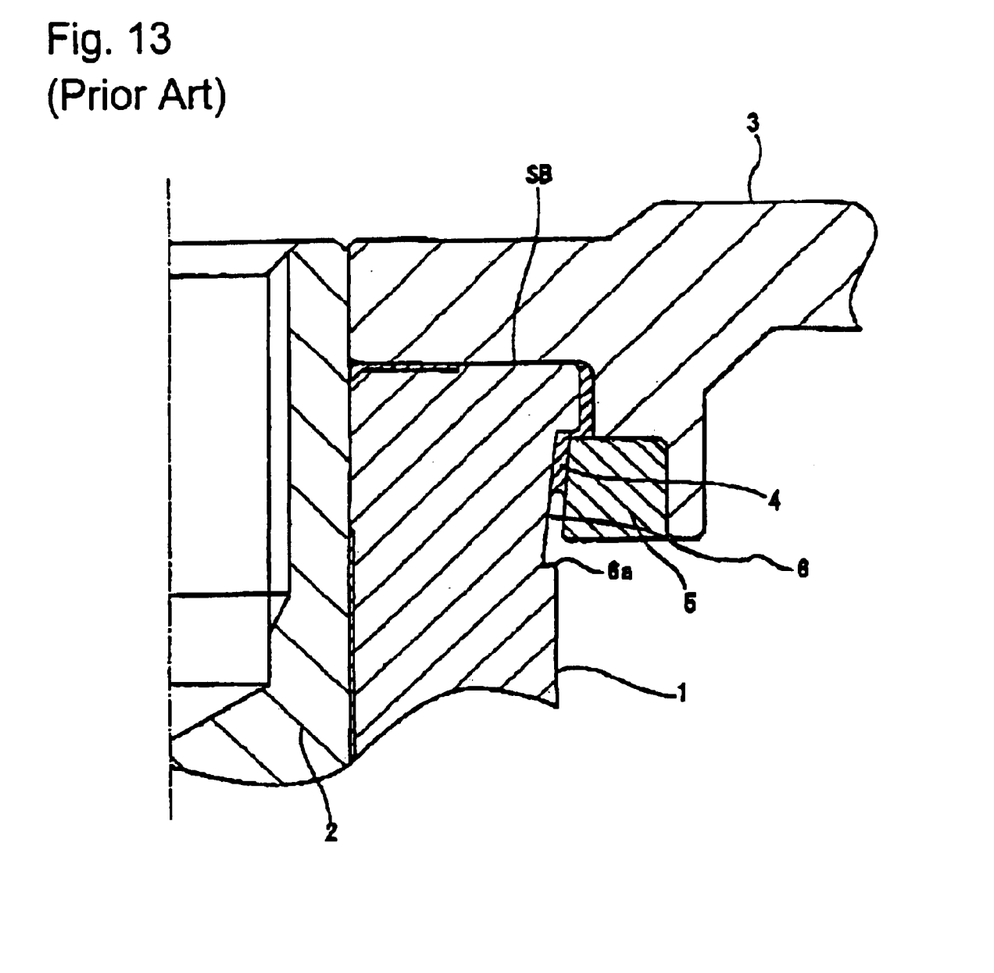
FIG. 13 is an enlarged longitudinal cross section of a dynamic pressure bearing section of a conventional dynamic pressure bearing device.

In recent years, the development of dynamic pressure bearing devices in which rotation shafts are supported by having lubricating fluid generate dynamic pressure has been underway in order to create bearing devices that can rotate rotary bodies at high-speeds and high precision in various types of rotary drive devices. In such dynamic pressure bearing devices, those having a thrust bearing section SB structured as indicated in FIG. 13, for example, have recently been proposed in order to make the entire device thinner. With respect to the thrust bearing section SB indicated in this figure, a rotary member 3 is attached to a rotary shaft 2, which is supported in a freely rotatable manner by a dynamic pressure bearing member 1, and an inner end surface (bottom end surface) in the axial direction at the center part of the rotary member 3 is positioned opposite and in close proximity in the axial direction to an end surface (top end surface) in the axial direction of the dynamic pressure bearing member 1, thereby forming the thrust bearing section SB.

In the interior of the thrust dynamic pressure bearing section SB, an appropriate amount of a lubricating fluid (omitted from drawings) is filled and herringbone-shaped dynamic pressure generating grooves, for example, are formed concavely in a ring shape as a dynamic pressure generating means for the lubricating fluid, so that the pressurizing effect of the dynamic pressure generating grooves causes dynamic pressure to be generated in the lubricating fluid and thereby yields a predetermined levitation force in the axial direction.

In the meantime, a fluid sealing section 4 comprising a capillary sealing section is formed in an area on the outer side in the radial direction of the thrust dynamic pressure bearing section SB, in order to prevent the lubricating fluid within the thrust dynamic pressure bearing section SB from flowing out. The fluid sealing section 4 can be formed by making use of an outer circumference wall surface of the dynamic pressure bearing member 1, for example. More specifically, a tapered sealing space is created by forming an appropriate gap between the outer circumference wall surface of the dynamic pressure bearing member 1 and an inner circumference wall surface of a counter plate 5, which is attached to the rotary member 3 to serve also as a fall-out stopping member, and by gradually enlarging the gap towards an opening section at the bottom.

To fill the lubricating fluid into the thrust dynamic pressure bearing section SB having such a structure, normally a vacuum pumping device is used to fill the lubricating fluid through the fluid sealing section 4. More specifically, the lubricating fluid is allowed to flow downward along the outer circumference wall surface of the dynamic pressure bearing member 1 and into the fluid sealing section 4. After the lubricating fluid is filled, residual lubricating fluid in the form of oil drops and/or films that are adhering to the outer circumference wall surface of the dynamic pressure bearing member 1 is removed by wiping with a solvent to clean the dynamic pressure bearing member 1.

A convex partition step section 6 is formed on the outer circumference wall surface of the dynamic pressure bearing member 1 and near the opening section of the fluid sealing section 4. The convex partition step section 6 projects outward in the radial direction and that partially covers the opening section of the fluid sealing section 4. Due to an effect derived from the shape (i.e., shape effect) of an edge section 6a of the partition step section 6, the lubricating fluid clinging to the outer circumference wall surface of the dynamic pressure bearing member 1 is effectively separated in a lubricating fluid removal process. In other words, the lubricating fluid that clings to the outer circumference wall surface of the dynamic pressure bearing member 1 separates into lubricating fluid in the area on the fluid sealing section 4 side (up in the figure) and lubricating fluid in the area on the opposite side of the fluid sealing section 4 side (down in the figure) with the partition step section 6 as the boundary, which allows the lubricating fluid removal process to be performed smoothly.

However, in the conventional device described above, due to the fact that the convex partition step section 6 has a shape that projects out and substantially cover the opening section of the fluid sealing section 4, the convex partition step section 6 becomes a visual obstacle to visually checking the amount of the lubricating fluid within the thrust dynamic pressure bearing section SB. In other words, the convex partition step section 6 blocks the view of the lubricating fluid that has been filled into the fluid sealing section 4 when the operator tries to see the liquid level of the lubricating fluid that has been filled into the fluid sealing section 4. Although the amount of the lubricating fluid within the thrust dynamic pressure bearing section SB may preferably be as much as possible from the perspective of lengthening the life of the thrust dynamic pressure bearing device, if the amount filled is excessive, the lubricating fluid is more prone to leaking outside through the opening section of the fluid sealing section 4, which can shorten the life of the dynamic pressure bearing device. Especially in devices that require a highly clean environment such as hard disk drive devices (HDDs), leaking of the lubricating fluid can cause contamination of internal equipment and lead to fatal problems for the entire device.

Consequently, a required and sufficient amount of the lubricating fluid must be filled within the thrust dynamic pressure bearing section SB, and to that end the amount of the lubricating fluid filled must be thoroughly checked visually. However, in conventional devices with the convex partition step section 6, visually checking the presence and/or the level of the lubricating fluid filled within the thrust dynamic pressure bearing section SB is difficult, which can diminish the reliability of the dynamic pressure bearing device.

SUMMARY OF THE INVENTION

In view of the above, the present invention relates to dynamic pressure bearing devices, as well as methods for manufacturing the same, in which the amount of lubricating fluid filled within thrust dynamic pressure bearing sections SB can be easily checked using simple configurations.

In order to solve the problem described above, a dynamic pressure bearing device in accordance with an embodiment of the present invention includes: a dynamic pressure bearing member and a fluid sealing section adjacent to the dynamic pressure bearing member, the dynamic pressure bearing member defining an outer circumference wall surface whose outer diameter dimension decreases in a direction in which the outer circumference wall surface of the dynamic pressure bearing section becomes removed in the axial direction from the fluid sealing section; and a ridge section provided in a specified area on the outer circumference wall surface of the dynamic pressure bearing member removed in the axial direction from the fluid sealing section, wherein the ridge section defines a surface that discontinuously bends along the axial direction in the outer circumference wall surface of the dynamic pressure bearing member.

In other words, according to the dynamic pressure bearing device having such a configuration, when an opening section of the fluid sealing section is viewed along the outer circumference wall surface of the dynamic pressure bearing member, the entire outer circumference wall surface of the dynamic pressure bearing member including the ridge section recedes towards the center from an axis of line of sight of the opening section of the fluid sealing section. As a result, in a lubricating fluid filling process, for example, the interior of the opening section of the fluid sealing section can be easily seen by a worker. By looking at the liquid level of the lubricating fluid inside the fluid sealing section, the overall amount of the lubricating fluid filled to reach the fluid sealing section, including a thrust dynamic pressure bearing section SB, can readily be checked.

Further, in a process to remove excess lubricating fluid that clings to the outer circumference wall surface of the dynamic pressure bearing member, a shape effect of the ridge section impedes the lubricating fluid from flowing; this effectively prevents residual lubricating fluid from flowing into the fluid sealing section, which allows the lubricating fluid removing process to be performed efficiently and effectively.

In the dynamic pressure bearing device according to the present invention, the ridge section may consist of an edge section of a step section. In addition, in a dynamic pressure bearing device according to the present invention, the ridge section may consist of an edge section of an intersecting section that is defined between an inclined tapered surface extending at an appropriate angle to a center axis line and another surface, which forms a surface that discontinuously bends along the axial direction. By the structures described above, the ridge section can be easily formed through such configurations.

In a method for manufacturing a dynamic pressure bearing device in accordance with an embodiment of the present invention, an outer circumference wall surface of a dynamic pressure bearing member is formed in a shape whose outer diameter dimension decreases in the direction the outer circumference wall surface of the dynamic pressure bearing section becomes removed in the axial direction from a fluid sealing section, and a ridge section is provided in a specified area on the outer circumference wall surface of the dynamic pressure bearing member removed in the axial direction from the fluid sealing section, wherein the ridge section defines a surface that discontinuously bends along the axial direction in the outer circumference wall surface of the dynamic pressure bearing member. As a result, the shape effect of the ridge section prevents the lubricating fluid and a lubricating fluid removing solution from flowing into the fluid sealing section in a lubricating fluid removing process.

In other words, according to the method for manufacturing the dynamic pressure bearing device having such a configuration, when an opening section of the fluid sealing section is viewed along the outer circumference wall surface of the dynamic pressure bearing member, the entire outer circumference wall surface of the dynamic pressure bearing member including the ridge section appears to be receded and pulled in towards the center from an axis of line of sight of the opening section of the fluid sealing section. As a result, in a lubricating fluid filling process, for example, the interior side of the opening section of the fluid sealing section can be easily seen by a worker; and by looking at the liquid level of the lubricating fluid inside the fluid sealing section, the overall amount of the lubricating fluid filled to reach the fluid sealing section, including a thrust dynamic pressure bearing section SB, can be easily checked.

Further, in a process to remove excess lubricating fluid that clings to the outer circumference wall surface of the dynamic pressure bearing member, the shape effect of the ridge section impedes the lubricating fluid from flowing, which effectively prevents residual lubricating fluid from flowing into the fluid sealing section, and which allows the lubricating fluid removing process to be performed efficiently and effectively.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Embodiments of the present invention are described in detail below with reference to the accompanying drawings. First, an overview of a hard disk drive device's (HDD) spindle motor is described as an example to which a dynamic pressure bearing device according to the present invention is applied.

Figure 1:
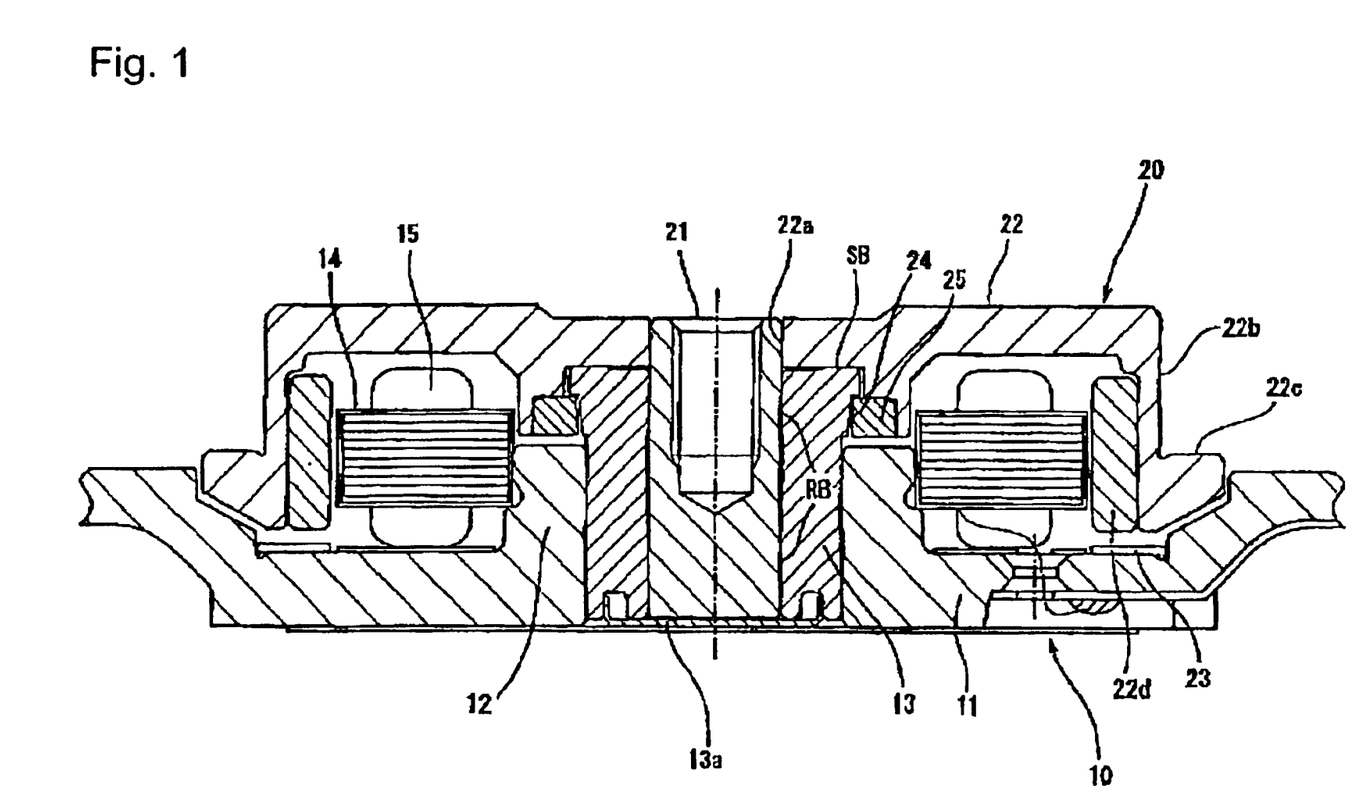
FIG. 1 is a longitudinal cross section of an overview of a shaft rotation-type HDD spindle motor with a dynamic pressure bearing device in accordance with an embodiment of the present invention.

The shaft rotation-type HDD spindle motor shown in FIG. 1 includes a stator assembly 10, which is a fixed member, and a rotor assembly 20, which is a rotary member assembled onto the top of the stator assembly 10. The stator assembly 10 has a fixed frame 11, which is screwed to a fixed base omitted from drawings. The fixed frame 11 is formed with an aluminum material to achieve a lighter weight; on the inner circumference surface of a ring-shaped bearing holder 12 formed upright in the generally center part of the fixed frame 11 is a bearing sleeve 13, which is a fixed bearing member formed in the shape of a hollow cylinder and joined to the bearing holder 12 through press fitting or shrink fitting. The bearing sleeve 13 is formed with a copper material such as phosphor bronze in order to more easily machine holes with small diameters.

On the outer circumference mounting surface of the bearing holder 12 is mounted a stator core 14, which consists of a laminate of electromagnetic steel plates, and a drive coil 15 is wound on each salient pole section provided on the stator core 14.

A rotary shaft 21 defining a part of the rotor assembly 20 is inserted in a freely rotatable manner in a center hole provided in the bearing sleeve 13. A dynamic pressure surface formed on an inner circumference wall section of the bearing sleeve 13 and a dynamic pressure surface formed on an outer circumference surface of the rotary shaft 21 are positioned opposite each other in the radial direction, and two radial dynamic pressure bearing sections RB and RB are formed in a minuscule gap section between the bearing sleeve 13 and the rotary shaft 21 with an appropriate interval between the two radial dynamic pressure bearing sections RB and RB in the axial direction. More specifically, the dynamic pressure surface on the bearing sleeve 13 side and the dynamic pressure surface on the rotary shaft 21 side of each of the radial dynamic pressure bearing sections RB are positioned opposite each other in a circular fashion across a minuscule gap of several micrometers, and a lubricating fluid such as a lubricating oil, magnetic fluid or air is filled or present in a continuous manner in the axial direction in a bearing space formed by the minuscule gap.

On at least one of the dynamic pressure surfaces of the bearing sleeve 13 or the rotary shaft 21 are herringbone-shaped radial dynamic pressure generating grooves, for example, that are concavely formed in a ring shape in two blocks separated in the axial direction. During rotation, a pumping effect of the radial dynamic pressure generating grooves pressurizes the lubricating fluid, which is omitted from drawings, to generate dynamic pressure, and a rotary hub 22, which is described later, together with the rotary shaft 21 becomes shaft-supported in a non-contact state in the radial direction with the bearing sleeve 13 due to the dynamic pressure of the lubricating fluid.

The rotary hub 22 that with the rotary shaft 21 comprises the rotor assembly 20 is a generally cup-shaped member made of an aluminum metal, and a joining hole 22a provided in the center part of the rotary hub 22 is joined in a unitary fashion with the top end part of the rotary shaft 21 through press fitting or shrink fitting. The rotary hub 22 has a body section 22b, which is generally cylindrically-shaped and serves to mount a recording medium disk such as a magnetic disk omitted from drawings on the outer circumference section, as well as a disk mounting section 22c, which projects outward in the radial direction from the body section 22b to support the recording medium disk in the axial direction. The recording medium disk may be fixed by a pressure applied from above in the figure by a damper (omitted from drawings) that may be screwed onto a part of the rotor assembly.

A ring-shaped drive magnet 22d is mounted on the inner circumference wall surface of the body section 22b of the rotary hub 22 via a back yoke. The inner circumference surface of the ring-shaped drive magnet 22d is positioned in a ring-shaped manner in close proximity to and opposite the outer circumference end surface of each of the salient poles of the stator core 14, while a bottom end surface in the axial direction of the ring-shaped drive magnet 22d is positioned opposite in the axial direction to a magnetic attraction plate 23 that is attached to the fixed frame 11. The magnetic attraction force between the members 22d and 23 causes the entire rotary hub 22 to be attracted in the axial direction, so that a stable rotating state can be obtained.

In the meantime, an opening section provided at the bottom end of the bearing sleeve 13 is closed off by a cover 13a, and this prevents the lubricating fluid inside each of the radial dynamic pressure bearing sections RB from leaking outside.

Figure 2:
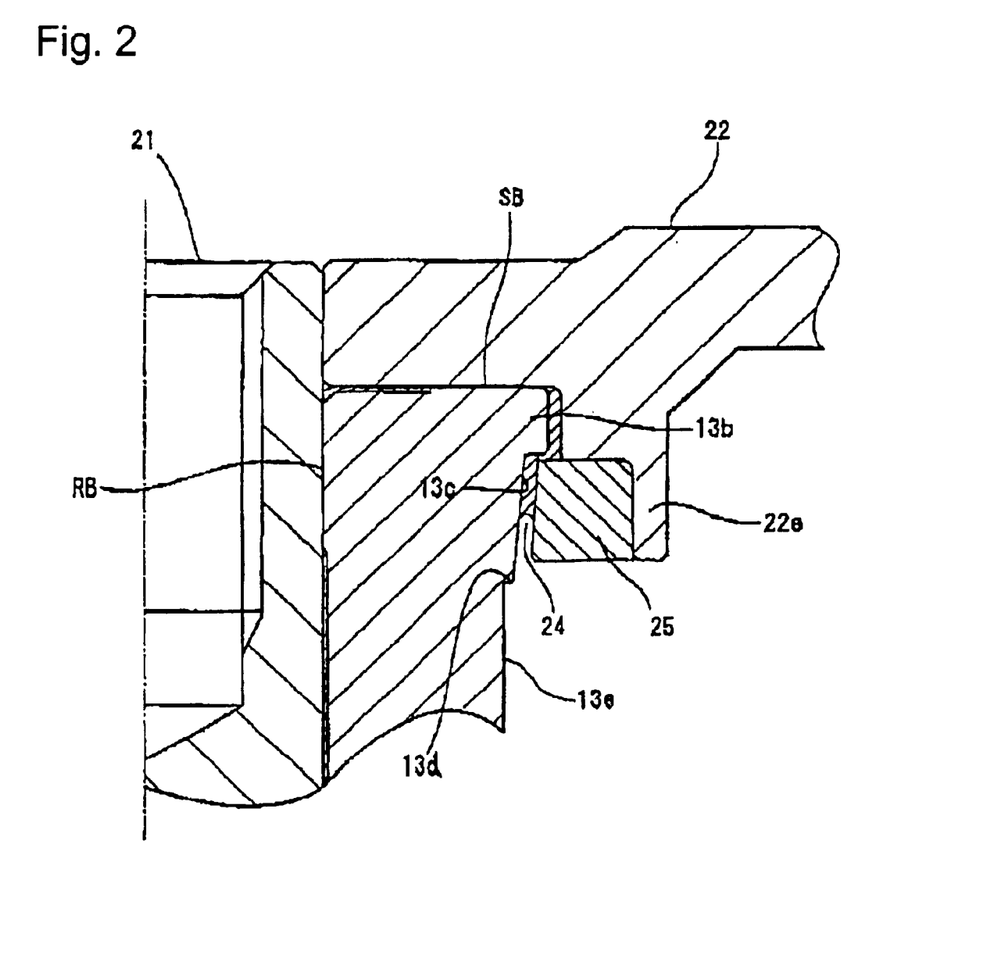
FIG. 2 is an enlarged longitudinal cross section of a dynamic pressure bearing section of the dynamic pressure bearing device used in the HDD spindle motor shown in FIG. 1.

As shown especially in FIG. 2, a top end surface of the bearing sleeve 13 and a bottom end surface in the center part of the rotary hub 22 are positioned in close proximity to and opposite each other in the axial direction, and a thrust dynamic pressure bearing section SB is provided in one part of a thrust opposing region between the top end surface of the bearing sleeve 13 and the bottom end surface of the rotary hub 22. In other words, on at least one of the opposing dynamic pressure surfaces 13 and 22 that comprise the thrust opposing region are formed herringbone-shaped thrust dynamic pressure generating grooves, and opposing parts in the axial direction that include the thrust dynamic pressure generating grooves comprise the thrust dynamic pressure bearing section SB.

The dynamic pressure surface on the top end surface of the bearing sleeve 13 and the opposing dynamic pressure surface in close proximity on the bottom end surface of the rotary hub 22, where the two dynamic pressure surfaces comprise the thrust dynamic pressure bearing section SB, are positioned opposite each other in the axial direction across a minuscule gap of several micrometers. The lubricating fluid such as oil, magnetic fluid or air is filled continuously from the radial dynamic pressure bearing sections RB into the bearing space comprising the minuscule gap. During rotation, a pumping effect of the thrust dynamic pressure generating grooves pressurizes the lubricating fluid to generate dynamic pressure; and the dynamic pressure of the lubricating fluid causes the rotary shaft 21 and the rotary hub 22 to be shaft-supported levitating in the thrust direction and in a non-contact state.

Furthermore, a fluid sealing section consisting of a capillary sealing section 24 is formed on the outermost circumference wall surface of the bearing sleeve 13, which is the dynamic pressure bearing member. The capillary sealing section 24 that serves as the fluid sealing section is formed on the outer side in the radial direction adjacent to the thrust dynamic pressure bearing section SB. The capillary sealing section 24 is formed by an outermost circumference wall surface of the bearing sleeve 13 and an inner circumference wall surface of a counter plate 25, which serves as a fall-out stopping member formed opposite the outermost circumference wall surface of the bearing sleeve 13 in the radial direction. The counter plate 25 consists of a ring-shaped member fixed to a flange section 22e provided on the rotary hub 22. The gap between the inner circumference wall surface of the counter plate 25 and the outermost circumference wall surface of the bearing sleeve 13 gradually enlarges towards an opening section at the bottom, thereby forming a tapered sealing space. The lubricating fluid in the thrust dynamic pressure bearing section SB is continuously filled until it reaches the capillary sealing section 24.

At the top end part of the bearing sleeve 13 is a fall-out flange section 13b that projects outward in the radial direction, and a part of the fall-out flange section 13b is positioned opposite a part of the counter plate 25 in the axial direction. The members 13b and 25 prevent the rotary hub 22 from falling out in the axial direction.

The outer circumference wall surface of the bearing sleeve 13, which is a dynamic pressure bearing member, has a shape whose outer diameter dimension decreases in the direction in which the outer circumference wall surface of the bearing sleeve 13 becomes removed in the axial direction (downward) from the capillary sealing section 24, which is the fluid sealing section. In other words, the part of the outer circumference wall surface of the bearing sleeve 13 that forms the capillary sealing section 24 is formed by a tapered surface 13c, whose diameter continuously decreases towards the opening section at the bottom, and the tapered surface 13c may extend at the same inclination from the opening section of the capillary sealing section 24 farther downward.

At the part of the tapered surface 13c on the outer circumference wall surface of the bearing sleeve 13 where it is no longer opposing the counter plate 25, a ridge section 13d is formed. The ridge section 13d forms the outer circumference wall surface of the bearing sleeve 13 into a surface that discontinuously bends along the axial direction. The ridge section 13d may consist of a step section that depresses downward, and an outer circumference wall surface 13e of the bearing sleeve 13 below the ridge section 13d has a cylindrical shape whose diameter is reduced by the depression of the step of the ridge section 13d. The outer circumference wall surface 13e in a cylindrical shape with a reduced diameter extends with the same diameter downward in a generally straight line along the axial direction.

According to the dynamic pressure bearing device of the present embodiment having such a configuration, when the opening section of the capillary sealing section 24 that serves as the fluid sealing section is viewed along the outer circumference wall surface of the bearing sleeve 13 that serves as the dynamic pressure bearing member, the entire outer circumference wall surface of the bearing sleeve 13 including the ridge section 13d appears to be receded and pulled in towards the center from an axis of line of sight of the opening section of the capillary sealing section 24. As a result, in a lubricating fluid filling process, for example, the interior of the opening section of the capillary sealing section 24 can be easily seen by a worker. By looking at the liquid level of the lubricating fluid inside the capillary sealing section 24, the overall amount of the lubricating fluid filled to reach the fluid sealing section, including the thrust dynamic pressure bearing section SB, can be easily checked.

In a process to remove excess lubricating fluid that may adhere to the outer circumference wall surface of the bearing sleeve 13 that serves as the dynamic pressure bearing member, a shape effect of the ridge section 13d impedes the lubricating fluid from flowing; this effectively prevents the residual lubricating fluid from flowing into the capillary sealing section 24, which allows the lubricating fluid removing process to be performed efficiently and effectively.

To make this point easier to understand, the process to fill the lubricating fluid into the thrust dynamic pressure bearing section SB is described below. In this connection, first, the overall assembly process for assembling the aforementioned HDD spindle motor is described below.

Figure 3:
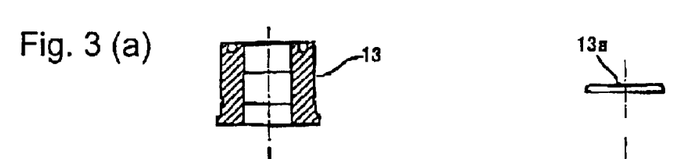
FIGS. 3(a)–3(e) are longitudinal cross sections indicating a processes involved in manufacturing a bearing assembly by attaching a rotary member to the dynamic pressure bearing section shown in FIG. 1.

First, as shown in FIG. 3(a), the bearing sleeve 13 that serves as the dynamic pressure bearing member is placed inverted of its position in the embodiment; and as shown in FIG. 3(b), the cover 13a is fixed to the opening section that faces up in the bearing sleeve 13. In the meantime, as shown in FIG. 3(c), a shaft/hub assembly in which the rotary hub 22 is fixed to the rotary shaft 21 is formed; and as shown in FIG. 3(d), the bearing sleeve 13 is mounted on the rotary shaft 21 of the shaft/hub assembly. Next, as shown in FIG. 3(e), the counter plate 25 is fixed to the flange section 22e of the rotary hub 22 of the shaft/hub assembly, and a bearing assembly A is formed. The lubricating fluid is filled as follows into the radial dynamic pressure bearing sections RB and the thrust dynamic pressure bearing section SB of the bearing assembly A.

Figure 4:
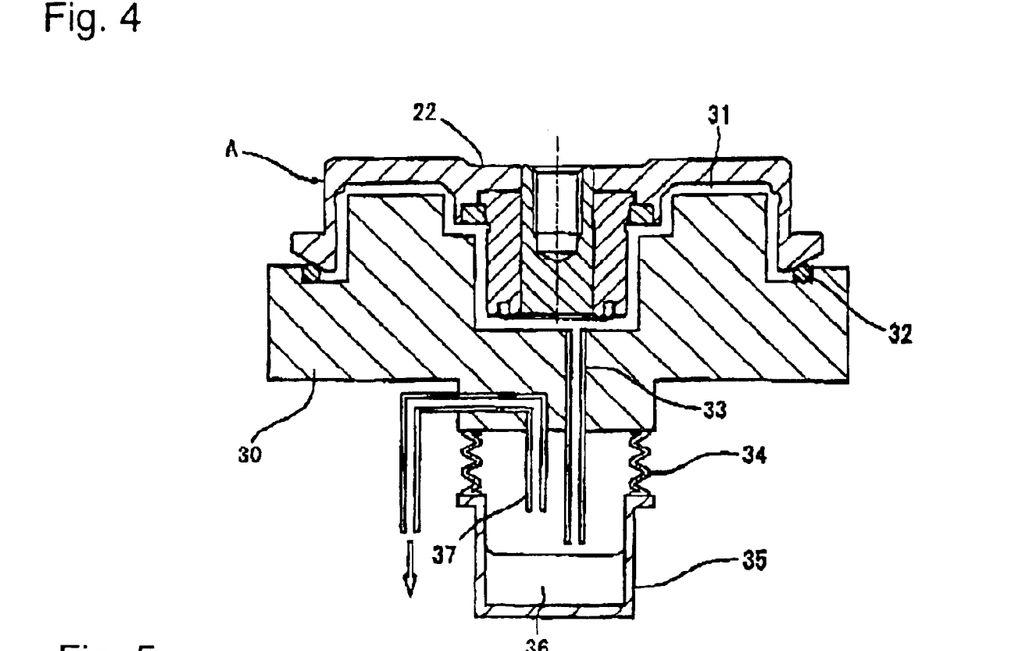
FIG. 4 is a longitudinal cross section indicating a step preceding a process to fill a lubricating fluid into the dynamic pressure bearing section of the bearing assembly shown in FIG. 3.

First, as shown in FIG. 4, the bearing assembly A is mounted on top of a filling jig 30, which is formed with concave and convex parts that match the inner shape of the bearing assembly A, so that the inner surfaces of the bearing assembly A oppose the filling jig 30, and a gap pathway 31 is formed between the filling jig 30 and the bearing assembly A. Next, an O ring 32 is mounted at the outer end section of the gap pathway 31, i.e., at an outer circumference end section of the rotary hub 22 that comprises the bearing assembly A, thereby making the gap pathway 31 a sealed space. Into the gap pathway 31 consisting of the sealed space opens a filling tube 33 that is provided to penetrate the filling jig 30; the filling tube 33 extends downward from an opening section of the gap pathway 31 and is positioned to protrude by an appropriate length from the bottom surface of the filling jig 30.

In the meantime, the part of the filling tube 33 that protrudes downward from the filling jig 30 is surrounded in a sealed state by an interior space of an oil tank 35 that is attached to the bottom surface of the filling jig 30 via an elastic bellows 34. A sufficient amount of lubricating fluid 36 is reserved inside the oil tank 35. When the bellows 34 is extended as in FIG. 4, the opening section at the bottom end of the filling tube 33 is maintained at an appropriate distance above the liquid level of the lubricating fluid 36 within the oil tank 35.

In addition to the filling tube 33, a suction tube 37 that is at a distance above the liquid level of the lubricating fluid 36 is placed in the space within the oil tank 35. The suction tube 37 penetrates the filling jig 30 and extends to the outside of the oil tank 35. Air within the oil tank 35 is extracted through a vacuum pumping device (omitted from drawings) connected to the suction tube 37, which causes the interior of the oil tank 35 to be suctioned to a virtually vacuum state.

Figure 5:
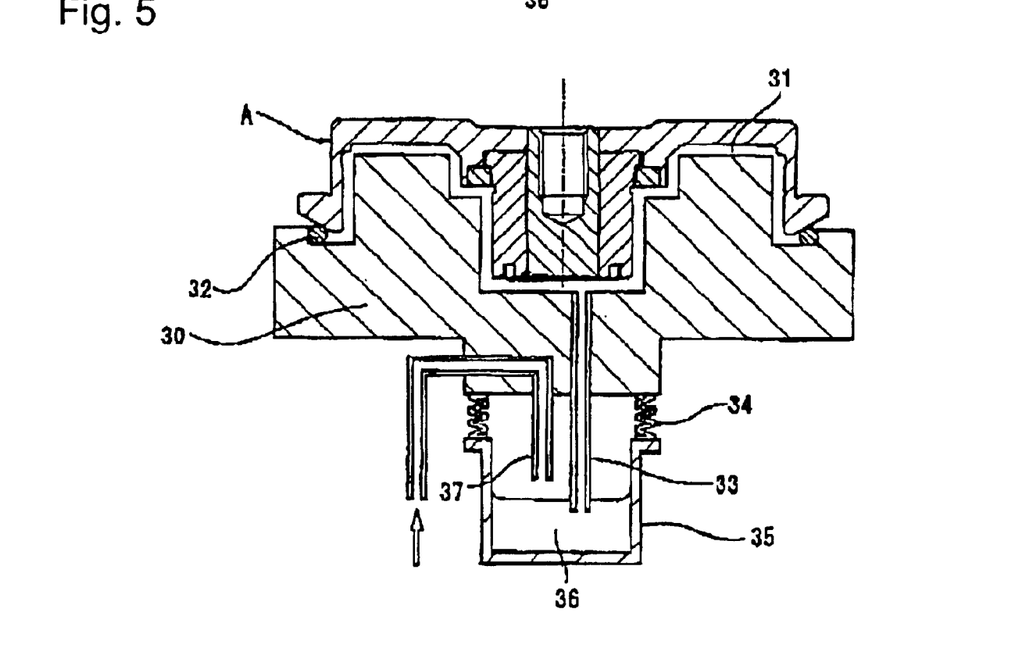
FIG. 5 is a longitudinal cross section indicating the process to fill the lubricating fluid into the dynamic pressure bearing section of the bearing assembly shown in FIG. 4.

After the interior of the oil tank 35 is suctioned to a virtually vacuum state, the bellows 34 is contracted as shown in FIG. 5 to raise the oil tank 35; this causes the opening part at the tip of the filling tube 33 to enter and be immersed in the lubricating fluid 36 within the oil tank 35. Next, the suction tube 37 is released to the atmosphere and air is sent into the oil tank 35; this causes the lubricating fluid 36 within the oil tank 35 to be supplied through the filling tube 33 into the gap pathway 31 between the filling jig 30 and the bearing assembly A. The lubricating fluid 36 supplied into the gap pathway 31 rises up along the outer circumference wall surface of the bearing sleeve 13, and after it flows into the capillary sealing section 24 the lubricating fluid 36 becomes filled throughout the thrust dynamic pressure bearing section SB and the radial dynamic pressure bearing sections RB.

Figure 6:
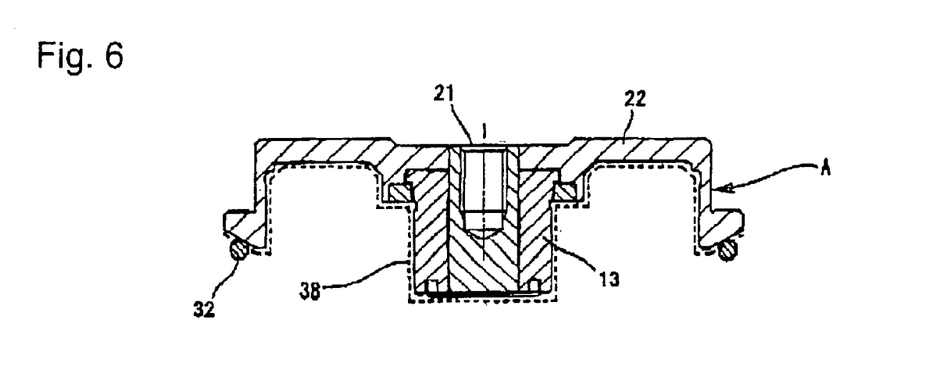
FIG. 6 is a longitudinal cross section indicating an example of the mounting position of an O ring and the coating position of an oil repellent in the lubricating fluid filling process.
Figure 7:
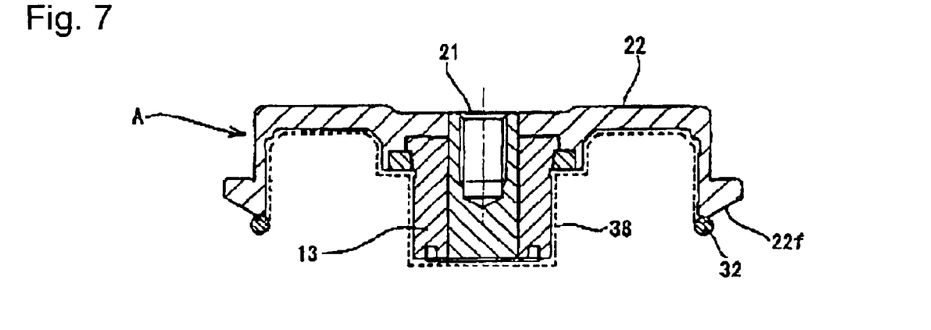
FIG. 7 is a longitudinal cross section of a different example of the mounting position of an O ring and the coating position of an oil repellent in the lubricating fluid filling process.
Figure 8:
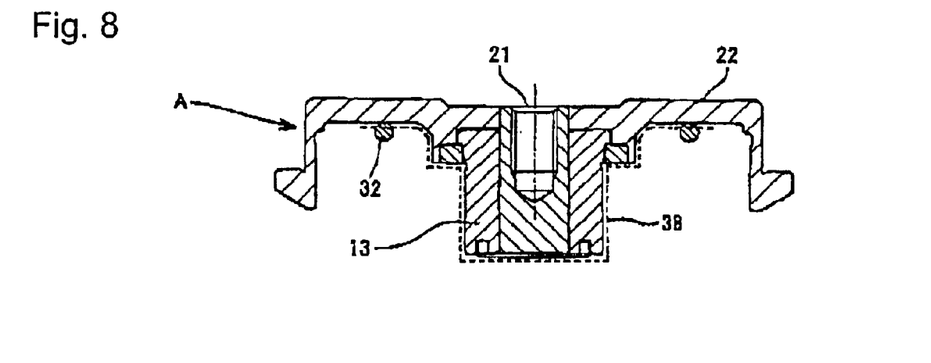
FIG. 8 is a longitudinal cross section of a different example of the mounting position of an O ring and the coating position of an oil repellent in the lubricating fluid filling process.
Figure 9:
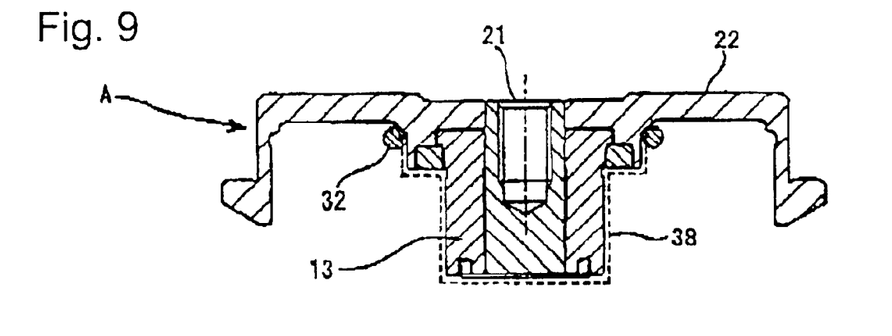
FIG. 9 is a longitudinal cross section of a different example of the mounting position of an O ring and the coating position of an oil repellent in the lubricating fluid filling process.
Figure 10:
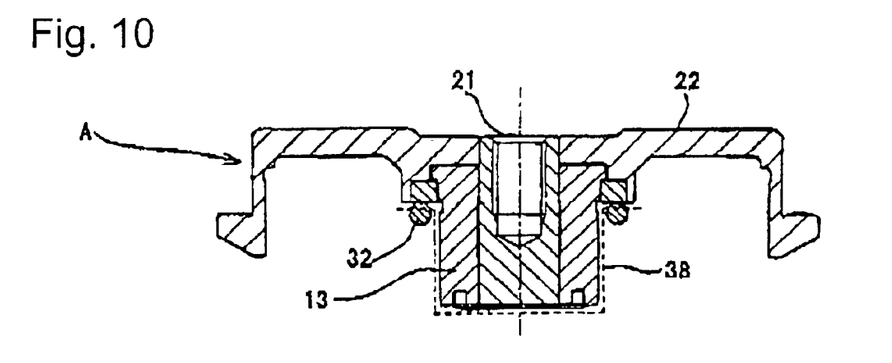
FIG. 10 is a longitudinal cross section of a different example of the mounting position of an O ring and the coating position of an oil repellent in the lubricating fluid filling process.
Figure 11:
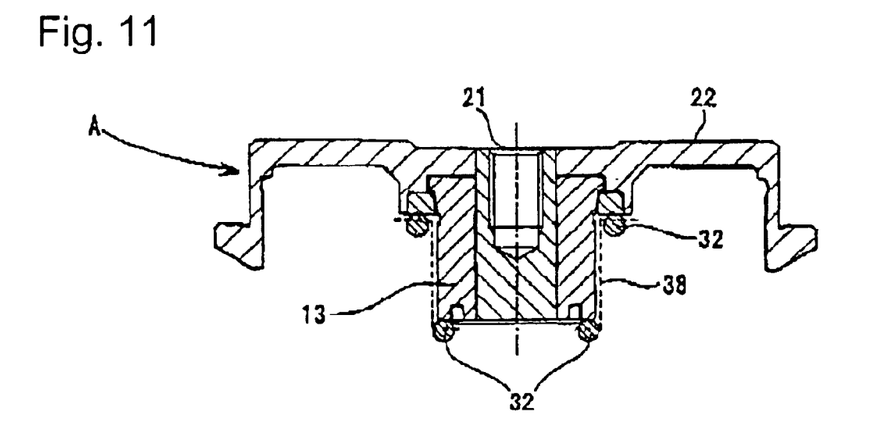
FIG. 11 is a longitudinal cross section of a different example of the mounting position of an O ring and the coating position of an oil repellent in the lubricating fluid filling process.

When the process to fill the lubricating fluid 36 as described takes place, an oil repelling treatment (oil barrier) 38 is rendered on the inner wall surfaces of the bearing assembly A, including the outer circumference wall surface of the bearing sleeve 13, as indicated by a broken line in FIG. 6. Residual fluid drops on the oil repelling treatment (oil barrier) 38 layer are cleaned by wiping them off with a solvent. In the process to remove the excess lubricating fluid clinging, the shape effect of the ridge section 13d provided on the outer circumference wall surface of the bearing sleeve 13 impedes the flow of the lubricating fluid 36 towards the capillary sealing section 24; this effectively prevents the residual lubricating fluid 36 from flowing into the capillary sealing section 24, which allows the lubricating fluid removing process to be performed efficiently and effectively.

In the lubricating fluid filling process described above, the O ring 32 is mounted on an inclined surface section 22f at the outer circumference end section of the rotary hub 22 to make the gap pathway 31 a sealed space. However, the mounting position of the O ring 32 can be any position shown in FIGS. 7 through 11, as long as the position is where the gap pathway 31 communicates with the dynamic pressure bearing section. In each of the positions shown in FIGS. 7 through 11, the O ring 32 is mounted at a place other than wall surfaces parallel to the axial direction, i.e., the O ring 32 is mounted on surfaces that extend orthogonal to the axial direction or inclined at an appropriate angle less than 90° to the axial direction; in each of these cases, the adhesion of the O ring 32 is favorable, which leads to a favorable filling. Further, in each of these cases, an oil repelling treatment (oil barrier) is rendered on the inner wall surfaces of the bearing assembly A in an area bound by the O ring 32 as indicated by a broken line.

Figure 12:
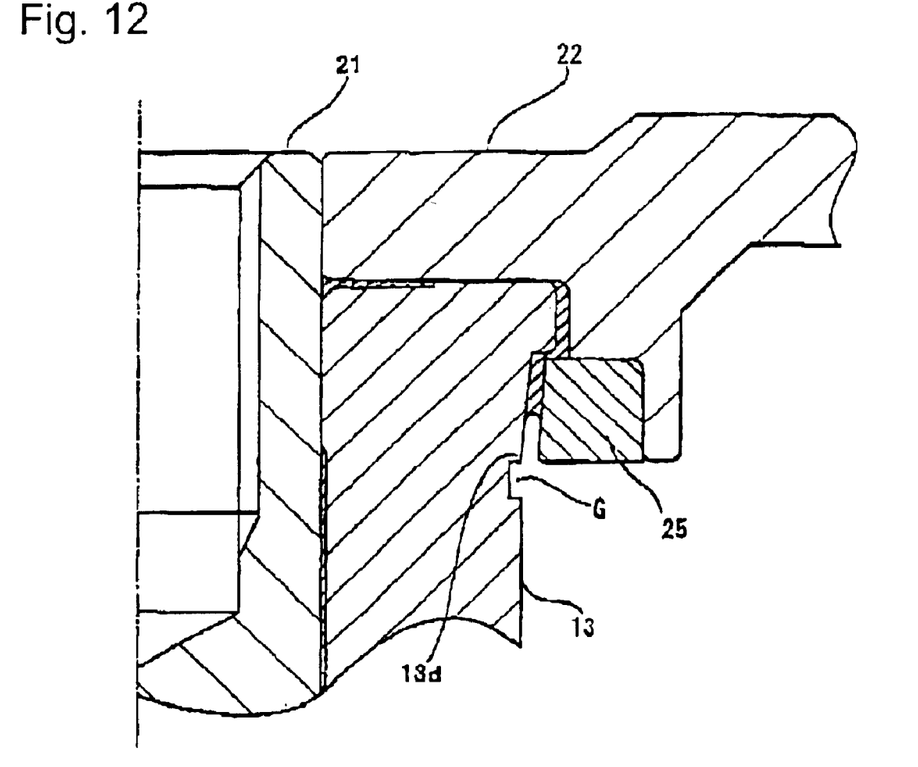
FIG. 12 is an enlarged longitudinal cross section of a thrust dynamic pressure bearing section of a dynamic pressure bearing device according to another embodiment of the present invention.

In the meantime, in an embodiment shown in FIG. 12 in which components identical to those in the embodiment described above are assigned the same numbers, a ridge section 13d comprising a step section is formed by a ring-shaped groove section G on an outer circumference wall surface of a bearing sleeve 13 that serves as a dynamic pressure bearing section. The ridge section 13d is formed at an upper edge section (in FIG. 12) of an opening section of the groove section G. A lower edge section of the groove section G is formed opposite the ridge section 13d in the axial direction. If the lower edge section is formed such that it does not project more outward in the radial direction than the ridge section 13d, actions and effects similar to the previous embodiment can be obtained.

The ridge section 13d in each of the embodiments described above is formed by a step section. However, a ridge section 13d may be formed from an edge section that is defined by two surfaces inclined at different angles with respect to a central axial line. For example, such an edge section may be defined by an inclined surface (a tapered surface), which extends, at an appropriate angle to the center axial line, on an outer circumference wall surface of the bearing sleeve 13 that serves as a dynamic pressure bearing section, and another wall surface of the bearing sleeve 13 that extends at a different angle, such as a wall surface in the axial direction, in which the inclined surface is linked discontinuously as it bends discontinuously in the axial direction against the other wall surface that extends at a different angle. This will yield actions and effects similar to the embodiments described.

The present invention by the inventor has been described in detail using embodiments, but the present invention is not limited to the embodiments described above and many modifications can be made without departing from the present invention.

For example, although each of the embodiments described above is an application of the present invention to an HDD spindle motor, the present invention can be applied similarly to various other types of dynamic pressure bearing devices.

As described above, in a dynamic pressure bearing device and its manufacturing method according to the present invention, an outer circumference wall surface of a dynamic pressure bearing member has a shape whose outer diameter dimension decreases in the direction in which the outer circumference wall surface of the dynamic pressure bearing section becomes removed in the axial direction from a fluid sealing section. By providing the outer circumference wall surface of the dynamic pressure bearing member which a ridge section that forms the outer circumference wall surface of the dynamic pressure bearing member into a surface that discontinuously bends along the axial direction, an opening section of the fluid sealing section becomes viewable along the outer circumference wall surface of the dynamic pressure bearing member. This makes it possible to easily check the overall amount of the lubricating fluid filled to reach the fluid sealing section, including a thrust dynamic pressure bearing section. At the same time, a shape effect of the ridge section prevents excess lubricating fluid that clings to the outer circumference wall surface of the dynamic pressure bearing member from flowing into the fluid sealing section, so that a lubricating fluid removing process can be performed efficiently and effectively. Consequently, the amount of the lubricating fluid in the dynamic pressure bearing device can be easily and properly maintained, which secures the life of the dynamic pressure bearing device, and a lubricating fluid filling process and the lubricating fluid removing process can be efficiently and effectively performed, which can dramatically improve the reliability of the dynamic pressure bearing device.

Further in the dynamic pressure bearing device according to the present invention, the ridge section may consist of an edge section of a step section. In addition, in the dynamic pressure bearing device according to the present invention, the ridge section may consist of an edge section linking an inclined tapered surface that extends at an angle to a center axial line to another surface that extends at an angle different from the angle of the inclined tapered surface. Due to the fact that the ridge section can be easily formed through such configurations, in addition to obtaining the effects described above, the productivity of the dynamic pressure bearing device can be improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A dynamic pressure bearing device comprising:
   a dynamic pressure bearing member defining an outer circumference wall surface, wherein the outer circumference wall surface of the dynamic pressure bearing member has an outer surface defined by diameters that decrease in an axial direction;
   a fluid sealing section at the outer surface of the dynamic pressure bearing member; and
   a ridge section provided in the outer circumference wall surface of the dynamic pressure bearing member and located removed in the axial direction from the fluid sealing section, wherein the outer circumference wall surface of the dynamic pressure bearing member is receded in a radial direction along the ridge section than the outer surface of the dynamic pressure bearing member.

2. A dynamic pressure bearing device according to claim 1, wherein the ridge section discontinuously bends the inclined outer surface of the dynamic pressure bearing member along the axial direction.

3. A dynamic pressure bearing device according to claim 1, wherein the ridge section discontinuously bends the outer surface of the dynamic pressure bearing member inward in the radial direction.

4. A dynamic pressure bearing device according to claim 1, wherein the outer circumference wall surface of the dynamic pressure bearing member includes a step section and the ridge section is defined by an edge section of the step section.

5. A dynamic pressure bearing device according to claim 1, wherein the ridge section is an edge section defined by the outer surface of the dynamic pressure bearing member and another surface that intersects the outer surface of the dynamic pressure bearing member.

6. A dynamic pressure bearing device according to claim 1, wherein the outer circumference wall surface of the dynamic pressure bearing member includes a groove section and the ridge section is defined by an edge section of the groove section.

7. A dynamic pressure bearing device according to claim 1, further comprising a thrust dynamic pressure bearing section formed by an end face in an axial direction of the dynamic pressure bearing member and an end face in an axial direction of a rotary member, wherein the fluid sealing section has one end adjacent to the thrust dynamic pressure bearing section and another end adjacent to the ridge section, wherein the fluid sealing section is formed at least along an inclined outer surface of the dynamic pressure bearing member between the one end of the fluid sealing section adjacent to the thrust dynamic pressure bearing section and the other end adjacent to the ridge section ridge, and wherein the ridge section discontinuously bends the inclined outer surface of the dynamic pressure bearing member inward in the radial direction along the axial direction.

8. A dynamic pressure bearing device according to claim 1, further comprising a thrust dynamic pressure bearing section formed by an end face in an axial direction of the dynamic pressure bearing member and an end face in an axial direction of a rotary member, wherein the fluid sealing section has one end adjacent to the thrust dynamic pressure bearing section and another end adjacent to the ridge section, wherein the fluid sealing section is formed at least along an inclined outer surface of the dynamic pressure bearing member between the one end of the fluid sealing section adjacent to the thrust dynamic pressure bearing section and the other end adjacent to the ridge section ridge, and wherein the outer circumference wall surface of the dynamic pressure bearing member includes a step section and the ridge section is defined by an edge section of the step section.

9. A dynamic pressure bearing device according to claim 1, further comprising a thrust dynamic pressure bearing section formed by an end face in an axial direction of the dynamic pressure bearing member and an end face in an axial direction of a rotary member, wherein the fluid sealing section has one end adjacent to the thrust dynamic pressure bearing section and another end adjacent to the ridge section, wherein the fluid sealing section is formed at least along an inclined outer surface of the dynamic pressure bearing member between the one end of the fluid sealing section adjacent to the thrust dynamic pressure bearing section and the other end adjacent to the ridge section ridge, and wherein the ridge section is an edge section defined by the included outer surface of the dynamic pressure bearing member and another surface that intersects the outer surface of the dynamic pressure bearing member.

10. A dynamic pressure bearing device according to claim 1, further comprising a thrust dynamic pressure bearing section formed by an end face in an axial direction of the dynamic pressure bearing member and an end face in an axial direction of a rotary member, wherein the fluid sealing section has one end adjacent to the thrust dynamic pressure bearing section and another end adjacent to the ridge section, wherein the fluid sealing section is formed at least along an inclined outer surface of the dynamic pressure bearing member between the one end of the fluid sealing section adjacent to the thrust dynamic pressure bearing section and the other end adjacent to the ridge section ridge, and wherein the outer circumference wall surface of the dynamic pressure bearing member includes a groove section and the ridge section is defined by an edge section of the groove section.

11. A dynamic pressure bearing device comprising:
    a dynamic pressure bearing member that generates a dynamic pressured by pressurizing a lubrication fluid by a dynamic pressure generation device, and supports a rotary shaft by the dynamic pressure generated in the lubrication fluid;
    a thrust dynamic pressure bearing member formed by an end face in an axial direction of the dynamic pressure bearing member and an end face in an axial direction of a rotary member that rotates together with the rotary shaft, which are disposed opposite each other in the axial direction; and
    a fluid sealing section for preventing the lubrication fluid in the thrust dynamic pressure bearing member from leaking outside, provided adjacent to an outer side section in a radial direction of the thrust dynamic pressure bearing member and defined by an outer circumference wall surface of the dynamic pressure bearing member, wherein the outer circumference wall surface of the dynamic pressure bearing member has an inclined outer surface having diameters that decrease in the axial direction, and a ridge section located removed in the axial direction from the fluid sealing section, wherein the outer circumference wall surface of the dynamic pressure bearing member is receded in the radial direction along the ridge section than the inclined outer surface of the dynamic pressure bearing member.

12. A dynamic pressure bearing device according to claim 11, wherein the ridge section discontinuously bends the inclined outer surface of the dynamic pressure bearing member along the axial direction.

13. A dynamic pressure bearing device according to claim 11, wherein the ridge section discontinuously bends the inclined outer surface of the dynamic pressure bearing member inward in the radial direction.

14. A dynamic pressure bearing device according to claim 11, wherein the outer circumference wall surface of the dynamic pressure bearing member includes a step section, and the ridge section is defined by an edge section of the step section.

15. A dynamic pressure bearing device according to claim 11, wherein the ridge section is an edge section defined by the outer inclined surface of the dynamic pressure bearing member and another surface that intersects the outer surface of the dynamic pressure bearing member.

16. A dynamic pressure bearing device according to claim 11, wherein the outer circumference wall surface of the dynamic pressure bearing member extends generally in parallel with a rotary axis of the rotary shaft and the inclined outer surface of the dynamic pressure bearing member extends at an angle to the rotary axis.

17. A method for manufacturing a dynamic pressure bearing device, the method comprising the steps of:

preparing a dynamic pressure bearing member that generates a dynamic pressure by pressurizing a lubrication fluid by a dynamic pressure generation section and supports a rotary shaft by the dynamic pressured generated in the lubrication fluid;

forming a thrust dynamic pressure bearing member by disposing an end face in an axial direction of the dynamic pressure bearing member opposite an end face in an axial direction of a rotary member that rotates together with the rotary;

forming a fluid sealing section for preventing the lubrication fluid in the thrust dynamic pressure bearing member from leaking outside, adjacent to an outer side section in a radial direction of the thrust dynamic pressure bearing member with an outer circumference wall surface of the dynamic pressure bearing member;

providing the outer circumference wall surface of the dynamic pressure bearing member at the fluid sealing section with an outer surface having diameters that decrease in the axial direction, and a ridge section located removed in the axial direction from the fluid sealing section, wherein the outer circumference wall surface of the dynamic pressure bearing member is receded in the radial direction along the ridge section than the outer surface of the dynamic pressure bearing member;

filling a lubrication fluid on the inside the thrust dynamic pressure bearing by flowing the lubrication fluid along the outer circumference wall surface of the dynamic pressure bearing member to thereby fill the lubrication fluid on the inside the thrust dynamic pressure bearing through the fluid sealing section;

removing with a lubrication fluid removing a portion of the liquid the lubrication fluid that clings to the outer circumference wall surface of the dynamic pressure bearing member; and preventing the lubrication fluid and the lubrication fluid removing liquid from flowing in the liquid sealing section in the lubrication fluid removing step by a shape effect generated by the ridge section.

18. A method for manufacturing a dynamic pressure bearing device according to claim 17, further comprising the step of forming a discontinuous bent section at the ridge section in the outer surface of the dynamic pressure bearing member that bends inward in the radial direction.

19. A method for manufacturing a dynamic pressure bearing device according to claim 17, further comprising the step of providing the outer circumference wall surface of the dynamic pressure bearing member with a step section that defines the ridge section.

20. A method for manufacturing a dynamic pressure bearing device according to claim 17, further comprising the step of forming an edge section at ridge section with the outer inclined surface of the dynamic pressure bearing member and another surface that intersects the outer surface of the dynamic pressure bearing member.

* * * * *